United States Patent [19]

Kapon et al.

[11] Patent Number: 5,078,516
[45] Date of Patent: Jan. 7, 1992

[54] TAPERED RIB WAVEGUIDES

[75] Inventors: Elyahou Kapon, Old Bridge, N.J.;
Arie Shahar, Redondo Beach, Calif.;
Robert N. Thurston, Colts Neck, N.J.

[73] Assignee: Bell Communications Research, Inc., Livingston, N.J.

[21] Appl. No.: 609,907

[22] Filed: Nov. 6, 1990

[51] Int. Cl.⁵ .................................................. G02B 6/12
[52] U.S. Cl. ...................................... 385/129; 385/14; 385/43
[58] Field of Search ............... 350/96.12, 96.15, 96.17, 350/96.11

[56] References Cited

U.S. PATENT DOCUMENTS

| | | | |
|---|---|---|---|
| 4,679,892 | 7/1987 | Haisma et al. | 350/96.12 |
| 4,773,720 | 9/1988 | Hammer | 350/96.12 |
| 4,991,926 | 2/1991 | Pavlath | 350/96.15 |

FOREIGN PATENT DOCUMENTS

| | | | |
|---|---|---|---|
| 0132105 | 8/1982 | Japan | 350/96.12 |
| 0211717 | 12/1983 | Japan | 350/96.12 |

OTHER PUBLICATIONS

Y. Shani et al., "Efficient Coupling of a Semiconductor Laser to an Optical Fiber by Means of a Tapered Waveguide on Silicon", Applied Physics Letters, 1989, vol. 55, pp. 2389–2391.

*Primary Examiner*—John D. Lee
*Assistant Examiner*—Stephen W. Barns
*Attorney, Agent, or Firm*—Leonard Charles Suchyta; Charles S. Guenzer

[57] ABSTRACT

A tapered single-mode rib waveguide for which only laterally patterning is required. A sublayer is disposed between the low-index substrate and the high-index rib and has an intermediate index. Preferably a thin buffer layer of very low refractive index is disposed between the rib and the sublayer. The widths of the rib are chosen so that in a wide portion the optical power of the single-mode is concentrated in the rib or buffer layer but in a narrow portion the optical power is concentrated in the sublayer or substrate and additionally has a wide lateral distribution. A similar effect can be obtained by tapering an upper rib disposed on top of an untapered lower rib.

9 Claims, 4 Drawing Sheets

TAPERED RIB WAVEGUIDES

FIELD OF THE INVENTION

The invention relates generally to optical waveguides; in particular, to rib waveguides of tapered cross-section.

BACKGROUND ART

An opto-electronic integrated circuit (OEIC) often requires an optical waveguide to connect different portions of the circuit. The waveguide may extend between two widely separated optical or optoelectronic devices or may optically couple an optical fiber positioned at the chip edge to an interior device. One popular type of such an optical waveguide is a rib waveguide in which a rib of high refractive index is formed above the substrate of lower refractive index. Both the substrate and the air surrounding the sides of the rib act as optical cladding to confine light to the vicinity of the rib. A low-index upper cladding may be interposed between the rib and the air.

For complex OEICs, the waveguide should be single mode. That is, the waveguide should support only one propagating mode, the higher-order modes being leaky modes, which are suppressed over a substantial length of the waveguide. Thereby, mode dispersion arising from different propagation velocities of the modes does not occur and waveforms are maintained over long distances. These same reasons require long-distance optical fibers to be single-mode, i.e., support only the $TEM_0$ mode. For single-mode operation, the cross-section of the waveguide is limited by the effective refractive index difference $\Delta n$ between the rib material and some average of the refractive indices of the substrate and air. As a general rule, if the effective index difference increases, the cross-section must decrease if the rib is to support a single guided mode.

A large cross-sectional waveguide offers some advantages. It has reduced surface scattering. Its large size implies optical fields of large cross-section which efficiently couple to the relatively large optical fibers. However, a large waveguide suffers large bending loss and is too large for efficient coupling to low power opto-electronic devices on the OEIC.

In view of different constraints at different points on the waveguide, a tapered rib would be desirable in which the cross-section of the waveguide varies along its length. One method achieves single-mode operation in a tapered structure by shaping the rib to have a cross-section with a somewhat constant aspect ratio along its length. The lateral tapering can be easily achieved. The additionally required vertical tapering, although possible, introduces complex processing.

Shani et al. disclosed a tapered rib waveguide structure made with fairly standard processing in a technical article "Efficient coupling of a semiconductor laser to an optical fiber by means of a tapered waveguide on silicon," *Applied Physics Letters*, volume 55, 1989, pages 2389-2391. Their waveguide structure transitioned between a large rib having a small effective index difference $\Delta n$ with the cladding to a small rib with a large $\Delta n$. The small rib ended in a lateral taper and was there covered on its top and sides by the large rib. Although this structure avoids any complex vertical tapering, it does require redeposition (a regrowth) of the large rib over the substrate from which the small rib has been removed. It further requires separate lateral definition for the large and small ribs.

SUMMARY OF THE INVENTION

Accordingly, an object of the invention is to provide a single-mode rib waveguide of varying cross-section.

A further object of the invention is to provide such a waveguide without utilizing a vertical taper.

The invention can be summarized as a single-mode rib waveguide in which a tapered reduction of the width of at least part of the rib causes the optical field to be pushed into the underlying cladding or substrate.

DETAILED DESCRIPTION OF THE PREFERRED EMBODIMENTS

Figure 1:
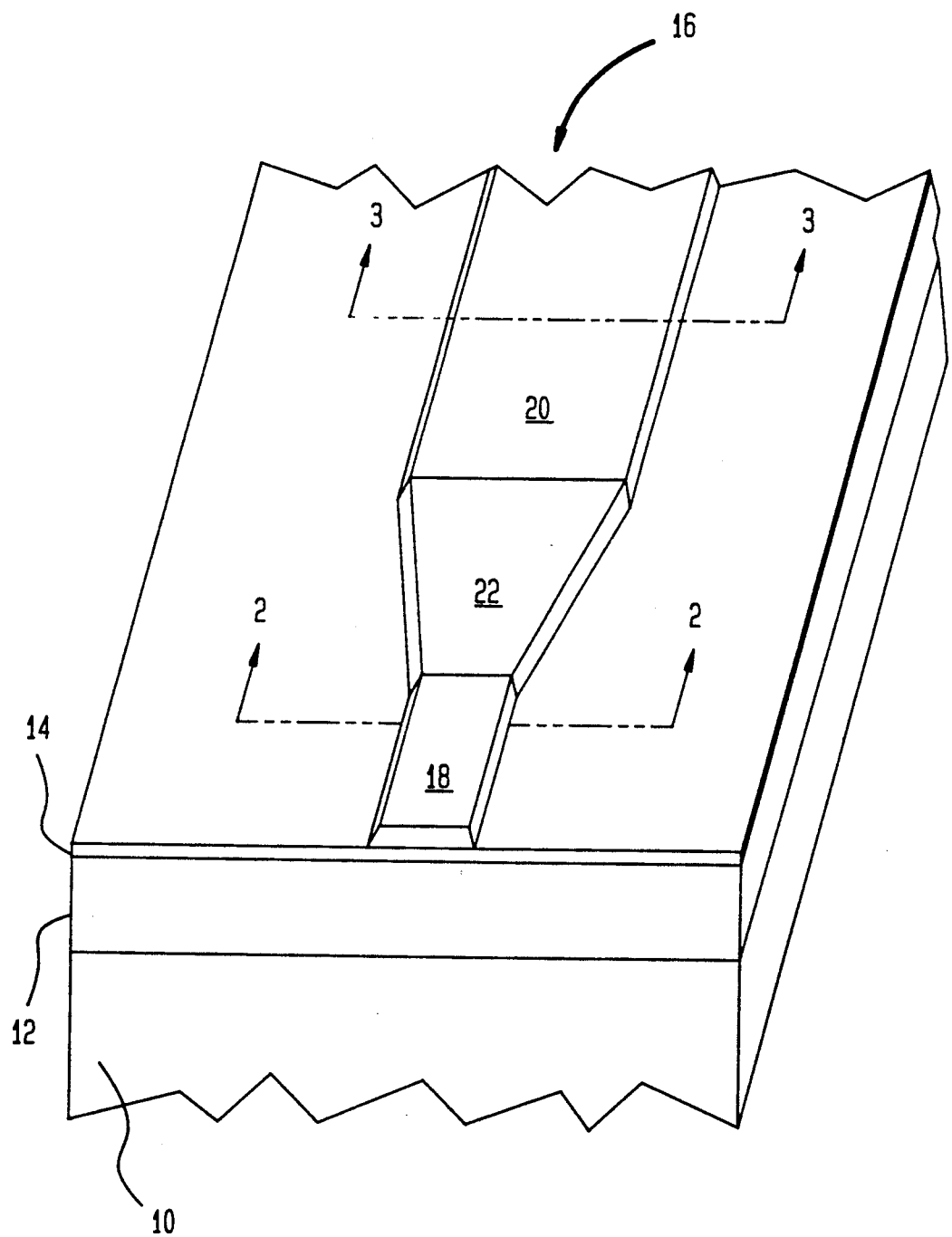
FIG. 1 is a perspective view of a first embodiment of the tapered rib waveguide of the invention.

A first embodiment of the invention, illustrated in perspective in FIG. 1, is a tapered rib waveguide designed to support a single optical mode at 1.55 $\mu$m. The required layers can be grown by either molecular beam epitaxy (MBE) or organometallic chemical vapor deposition (OMCVD). A substrate 10 of $Al_{0.1}Ga_{0.9}As$ is used for subsequent epitaxial growth. In practice, the substrate 10 is a relatively thick epitaxial thin-film layer grown on a bulk GaAs substrate. A sublayer 12 of $Al_{0.08}Ga_{0.92}As$ is first deposited to a thickness of 1.8 $\mu$m. Then, a buffer layer 12 of $Al_{0.1}Ga_{0.9}As$ is deposited to a thickness of 0.2 $\mu$m. On top is deposited a rib layer of GaAs to a thickness of 1.0 $\mu$m. The rib layer is then photolithographically patterned to form a rib 16 rising to a height 0.95 $\mu$m above an unillustrated planar remnant of the rib layer having a thickness 0.05 $\mu$m. The rib 16 has three parts, a narrow rib 18, a wide rib 20, and a taper 22 connecting the two. The narrow rib 18 has a width of 2.5 $\mu$m at its base and 1.5 $\mu$m at its top, while the wide rib 20 has a width of of 7 $\mu$m at its base and 8 $\mu$m at its base. (The trapezoidal cross-sections are typical of ribs defined by wet chemical etching. Dry etching yields rectangular cross-sections.) The taper 22 is linearly tapered over a long distance (typically on the order of 100 $\mu$m or less than about a 1° taper) in order to present an adiabatic transition.

The refractive indices for these materials are presented in Table 1.

TABLE 1

| Part | Material | Refractive Index |
|---|---|---|
| | air | 1.0 |
| rib | GaAs | 3.37349 |
| buffer | $Al_{0.1}Ga_{0.9}As$ | 3.32735 |
| sublayer | $Al_{0.08}Ga_{0.92}As$ | 3.33658 |
| substrate | $Al_{0.1}Ga_{0.9}As$ | 3.32735 |

Figure 2:
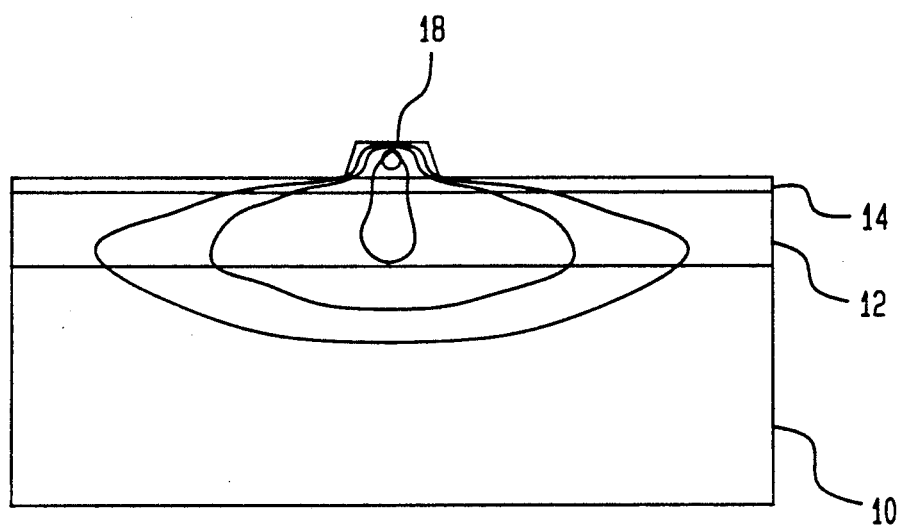
FIGS. 2 and 3 are cross-sections taken along sectional lines 2—2 and 3—3 of FIG. 1, including field contours of the confined light.
Figure 3:
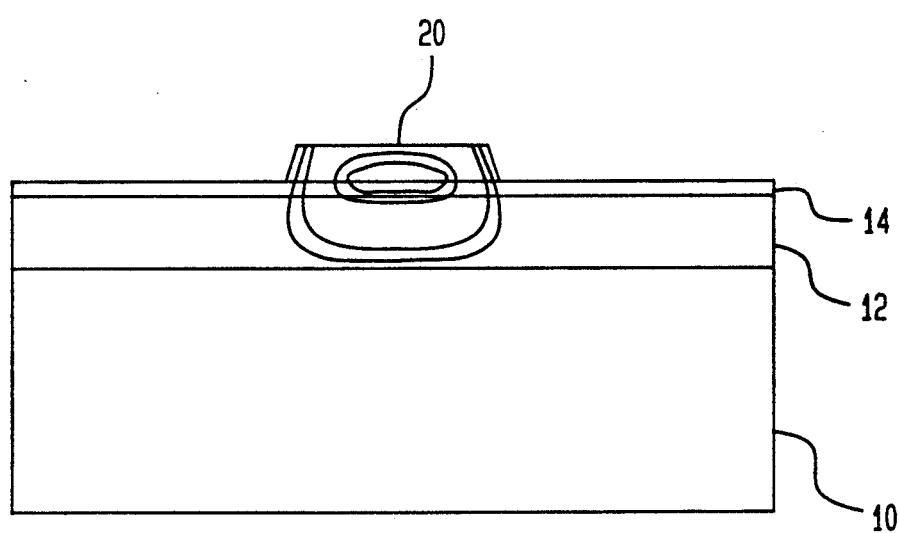

The optical fields have been calculated for light propagating in various portions of the illustrated tapered waveguide. The light was assumed to have a free-space wavelength of 1.52 $\mu$m, typically used in optical communication applications. The contour lines for the electrical field are illustrated in FIG. 2 for the narrow rib 18 and in FIG. 3 for the wide rib 20. The four illustrated contours in each figure are for 10%, 20%, 80% and 90% of the maximum value of the electric field. These contours show single-mode guided operation in both cases. However, the single-mode is tightly confined in both the lateral and vertical direction to the wide rib 20, while it spreads and becomes much larger in both directions for the narrow rib 18.

The first embodiment was designed with the following principles in mind. A planar symmetric waveguiding structure consisting of a high-index core layer sandwiched between identical low-index cladding layers will always support a propagating mode although the tails of the optical distribution of the lowest-order mode may extend far into the cladding layers. However, when air is used as the upper cladding, the waveguiding structure becomes asymmetric. There is a minimum thickness $t_{min}$ to the core layer for an asymmetric waveguide structure below which the lowest-order optical mode simply exponentially decays into the substrate and is thus a radiating mode, not a propagating wave. Often a rib is made of the same material as a thin planar layer directly underlying it. The thickness of the material in and below the rib is greater than $t_{min}$ while the thickness of the planar layer is less than $t_{min}$. Similarly, there is a minimum width $w_{min}$ for a rib to support a propagating mode. The values of $t_{min}$ and $w_{min}$ depend on the refractive index difference $\Delta n$ between the core (rib) and the cladding (substrate) and generally decrease with increasing $\Delta n$. The embodiment of FIG. 1 was designed so that the effective $\Delta n$ for the buffer layer 14 was sufficiently large to support a mode in the wide rib 20 with significant optical power in the buffer layer 14, but the buffer layer 14 will not support a mode in the narrow rib 18. However, at the narrow rib 18, the optical mode is shifted vertically to the sublayer 12, where it is supported and additionally has a large spot size.

Figure 4:
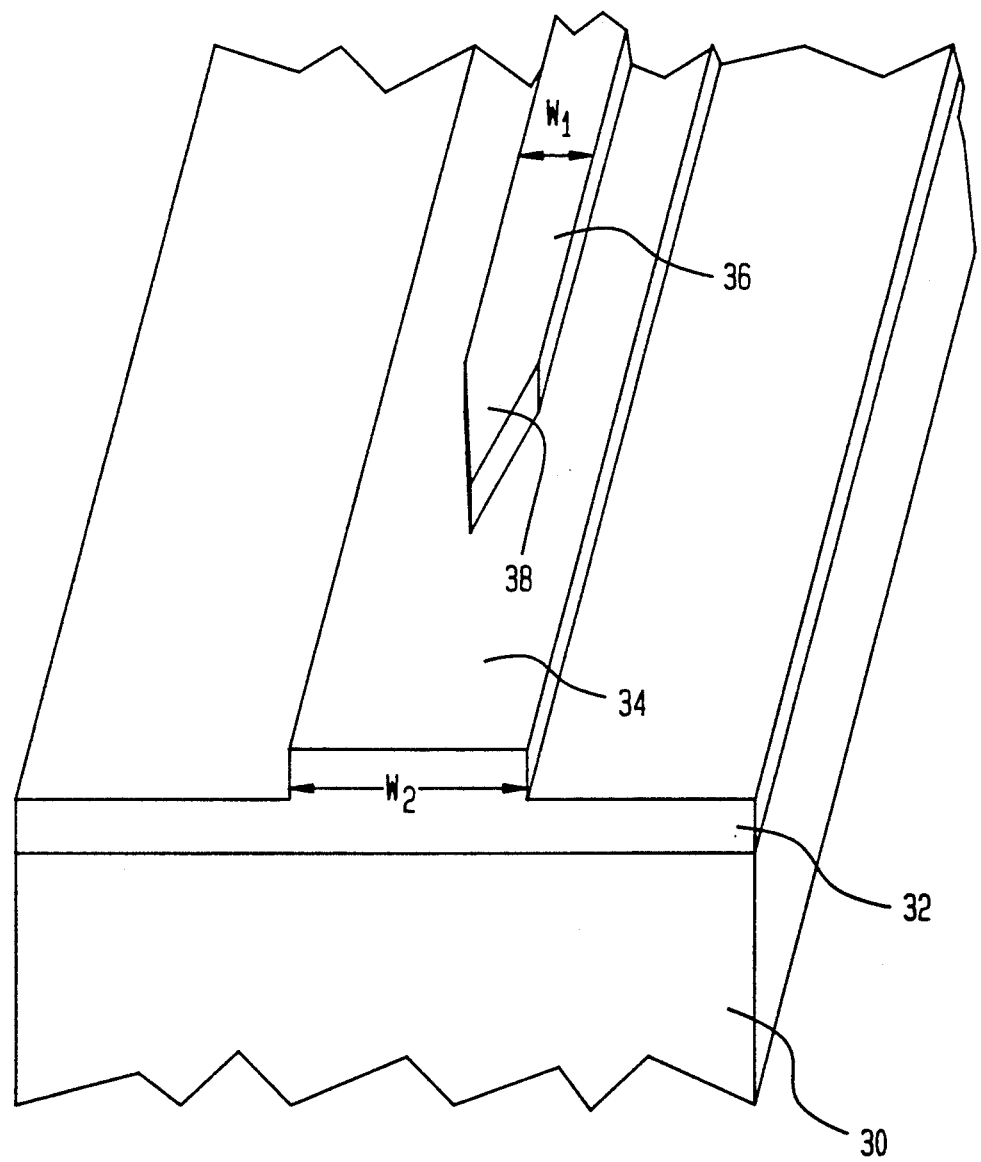
FIG. 4 is a perspective view of a second embodiment of the invention.

A second embodiment of the invention is illustrated in the perspective view of FIG. 4. A substrate 30 of $Al_{0.1}Ga_{0.9}As$ has a refractive index of 3.32702. A guiding layer 32 of $Al_{0.08}Ga_{0.92}As$ has a refractive index of 3.33626. It is formed into a planar portion having a thickness of 0.8 $\mu$m and a shoulder rib 34 rising 1 $\mu$m above the planar portion. The shoulder rib 34 has a width $W_2$ of 14 $\mu$m. An upper rib 36 is centrally formed above the shoulder rib 34 and includes a tapered portion 38. The upper rib 36 and its tapered portion 38 are formed of GaAs and have a refractive index of 3.37317. The upper rib 36 has a width $W_1$ of 3.5 $\mu$m, while the tapered portion 38 has a width gradually tapering from $W_1$ to zero over a distance of typically ~100 $\mu$m. Two photolithographic steps performed after deposition of all the layers are needed to form the two ribs 34 and 36.

The advantage of the second embodiment is in the greater flexibility in the design of the larger mode-size waveguide. More specifically, the width of the modes may be varied by properly designing the width of the wider ridge.

The refractive indices given in both embodiments are those used in calculations and need not be exactly duplicated to achieve the effects of the invention. The indices differ between the two embodiments for nominally the same materials. Ultimately, the refractive index depends upon the exact proportions of Al and Ga.

The calculations for the optical energy distribution for 1.52 $\mu$m radiation propagating along the tapered waveguide of FIG. 4 show tight confinement beneath the upper rib 36 and loose confinement, at least relative to the other situation, beneath the portion of the shoulder rib 34 without the upper rib 36.

Figure 5:
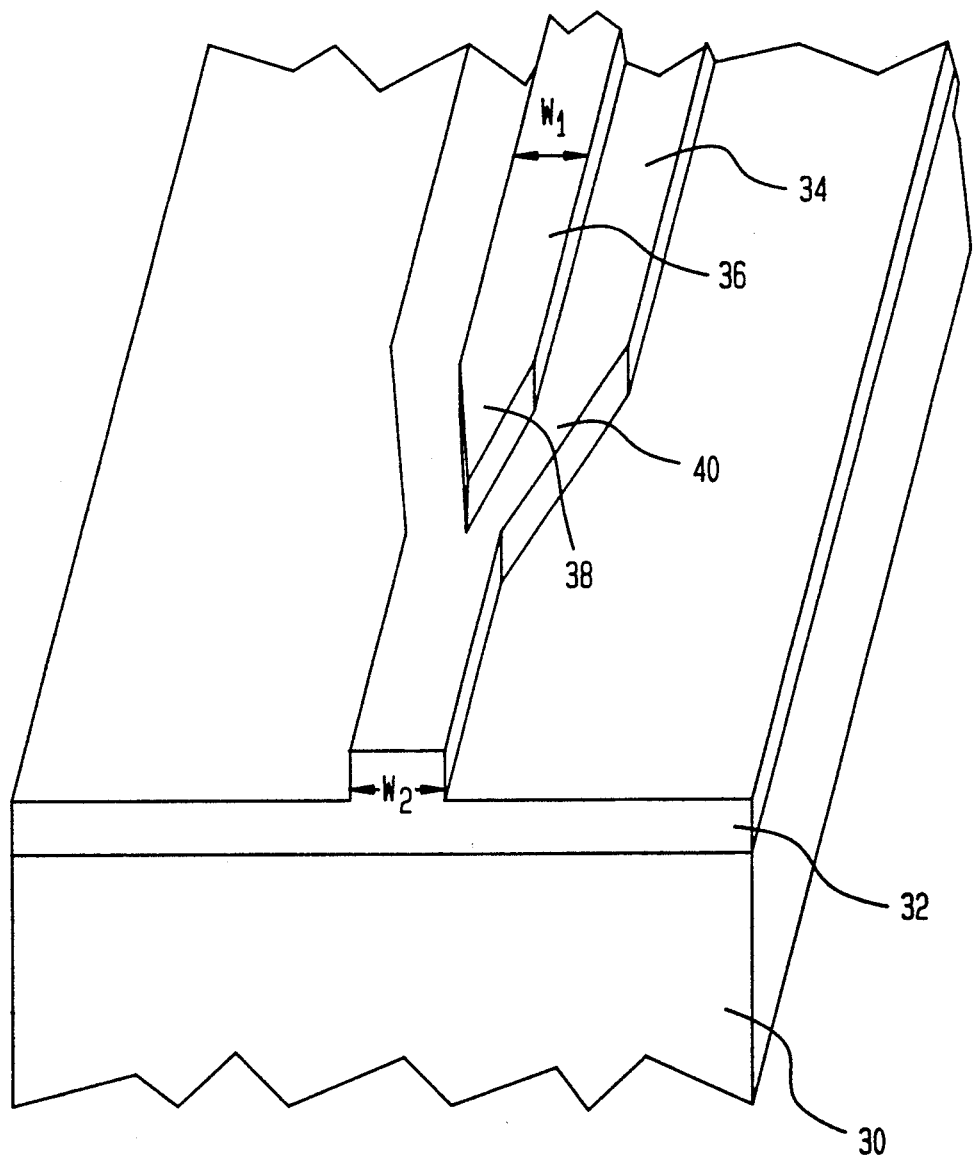
FIG. 5 is a perspective view of a third embodiment embodiment of the invention.

The embodiment of FIG. 4 may be modified so that the upper rib tapers from a wide portion to a finite width narrow portion. The two embodiments can be combined as illustrated in the perspective view of FIG. 5, by tapering the width $W_2$ of the shoulder rib 34 in the vicinity of the tapered portion 38 of the upper rib 36 to form a lower tapered portion 40 upper. That is, the shoulder and upper ribs 34 and 36 would both be tapered.

From the calculated optical fields, coupling losses to a butted optical fiber were estimated by calculating the overlap with a circular Gaussian beam having a 1/e radius of 4.5 $\mu$m, typical of optical fibers. In the embodiment of FIG. 1, the tapering reduced the coupling loss from 3 dB to 1.4 dB. In the embodiment of FIG. 4, the coupling loss was calculated to be 1 dB.

The embodiment of FIG. 4 did not use a low-index buffer layer below its ribs. Such a buffer layer could be included. Also, the single-rib embodiment could dispense with the buffer layer if the widths of the rib were correspondingly changed.

Either of the embodiments can be fabricated by standard semiconductor processes. The layers may be deposited by molecular beam epitaxy (MBE) or organometallic chemical vapor deposition (OMCVD). Etching of the ribs may be performed by standard wet chemical etching, e.g., using the $H_2SO_4:H_2O_2:H_2O$ system, or by reactive ion etching or Ar ion milling. The photolithography is nonstandard only in the non-rectilinear patterning for the laterally tapered portions, an easy change. For the double-rib embodiment of FIG. 4, care must be taken to laterally align the two ribs.

Although the invention has been described for semiconductor waveguide, the invention can be applied to other compositions of rib waveguides.

The invention thus provides a simple, easily fabricated, and passive structure for a single-mode waveguide in which the size of the optical field can be varied over different portions of the integrated optical circuit.

What is claimed is:

1. A tapered single-mode rib waveguide, comprising:
   a substrate having a first refractive index;
   a sublayer formed on said substrate and having a second refractive index greater than said first refractive index;
   a buffer layer formed on said sublayer and having a third refractive index less than or equal to said second refractive index; and
   a tapered rib formed on said buffer layer and having a fourth refractive index greater than or equal to said second refractive index, wherein said tapered rib comprises a first longitudinally untapered portion of a first cross-section and a longitudinally tapered portion smoothly connected to said first portion and flaring laterally outward therefrom.

2. A rib waveguide as recited in claim 1, wherein said tapered rib further comprises a second longitudinally untapered portion of a second-section larger than said first cross-section.

3. A rib waveguide as recited in claim 2, wherein at a predetermined wavelength a single optical mode is supported partially within both said first and second portions.

4. A rib waveguide as recited in claim 3, wherein said rib has a substantially constant height in said first, second, and tapered portions.

5. A tapered single-mode rib waveguide, comprising:
a substrate of a first refractive index;
a first rib of a second refractive index greater than said first refractive index formed on said substrate and longitudinally extending along a surface thereof; and
a second rib of a third refractive index greater than said second refractive index formed on said first rib and longitudinally extending along a medial surface portion thereof, said second rib having a varying width in a first portion and a substantially constant width in a second portion.

6. A tapered single-mode rib waveguide, comprising:
a substrate of a first refractive index;
a layer formed on said substrate and having a second refractive index greater than said first refractive index;
a first rib of said second refractive index formed on said layer and longitudinally extending along a surface thereof; and
a second rib of a third refractive index greater than said second refractive index formed on said first rib and longitudinally extending along a medial surface portion thereof, said second rib having a varying width in a first portion and a substantially constant width in a second portion.

7. A rib waveguide as recited in claim 6, wherein said second rib has a terminating point on said surface of said first rib.

8. A tapered single-mode rib waveguide, comprising:
a substrate of a first refractive index;
a first rib of a second refractive index greater than said first refractive index formed on said substrate and longitudinally extending along a surface thereof; and
a second rib of a third refractive index formed on said first rib and longitudinally extending along a medial surface portion thereof, said second rib having a varying width in a first portion and a substantially constant width in a second portion;
wherein said first rib has a varying width in a portion adjacent said first portion of said second rib.

9. A rib waveguide as recited in claim 8, wherein said third refractive index is greater than said second refractive index.

* * * * *